(12) United States Patent
Wurzbacher et al.

(10) Patent No.: US 11,418,892 B2
(45) Date of Patent: Aug. 16, 2022

(54) METHOD OF OPERATING A HEARING DEVICE, AND HEARING DEVICE

(71) Applicant: SIVANTOS PTE. LTD., Singapore (SG)

(72) Inventors: Tobias Wurzbacher, Fuerth (DE); Thomas Kuebert, Lohr (DE)

(73) Assignee: Sivantos Pte. Ltd., Singapore (SG)

(*) Notice: Subject to any disclaimer, the term of this patent is extended or adjusted under 35 U.S.C. 154(b) by 0 days.

(21) Appl. No.: 17/088,839

(22) Filed: Nov. 4, 2020

(65) Prior Publication Data

US 2021/0051420 A1 Feb. 18, 2021

Related U.S. Application Data

(63) Continuation of application No. PCT/EP2019/052774, filed on Feb. 5, 2019.

(30) Foreign Application Priority Data

May 4, 2018 (DE) .......................... 102018206975.1

(51) Int. Cl.
*H04R 25/00* (2006.01)
*G01P 1/02* (2006.01)
*G01P 15/18* (2013.01)

(52) U.S. Cl.
CPC .............. *H04R 25/40* (2013.01); *G01P 1/023* (2013.01); *G01P 15/18* (2013.01); *H04R 25/552* (2013.01); *H04R 2225/41* (2013.01)

(58) Field of Classification Search
CPC .... H04R 5/033; H04R 1/1016; H04R 1/1041; H04R 1/1008; H04R 2225/55;
(Continued)

(56) References Cited

U.S. PATENT DOCUMENTS 10,142,744 B2    11/2018 Mauler
2012/0114132 A1*  5/2012 Abrahamsson ......... H04S 7/304
                                             381/74
(Continued)

FOREIGN PATENT DOCUMENTS

CN    103745507 A     4/2014
DE    102015219572 A1 4/2017
DE    102015219573 A1 4/2017

*Primary Examiner* — Norman Yu
(74) *Attorney, Agent, or Firm* — Laurence A. Greenberg; Werner H. Stemer; Ralph E. Locher (57) ABSTRACT

A hearing device has an acceleration sensor that measure along three mutually perpendicular measurement axis. A movement of the hearing aid wearer is deduced from acceleration data of the acceleration sensor issued in an acceleration signal, a movement plane of the movement of the hearing aid wearer is derived from the acceleration data, a movement axis and a movement direction of the movement are ascertained from the acceleration data, and the presence of a rotational movement of the head is deduced on the basis of the movement plane, the movement axis and the movement direction. A direction of view probability distribution is created from the detected rotational movements, in particular on the basis of a yaw angle ascertained in the process. The direction of view probability distribution specifies a probability that the actual direction of view of the hearing aid wearer extends along an assigned angle.

26 Claims, 5 Drawing Sheets

(58) Field of Classification Search
CPC .. H04R 25/30; H04R 25/40; H04R 2225/025; H04R 25/552; H04R 25/55; H04R 25/50; H04R 2225/41; G01P 1/023; G01P 15/18
USPC .......................... 381/23.1, 58, 312, 74, 314
See application file for complete search history.

(56) References Cited

U.S. PATENT DOCUMENTS

| | | | |
|---|---|---|---|
| 2015/0230036 A1* | 8/2015 | Pedersen | H04R 1/1041 381/330 |
| 2016/0205450 A1* | 7/2016 | Gartseev | H04Q 9/00 340/870.09 |
| 2018/0104573 A1* | 4/2018 | Jeffery | A63F 13/812 |

* cited by examiner

METHOD OF OPERATING A HEARING DEVICE, AND HEARING DEVICE

CROSS-REFERENCE TO RELATED APPLICATION

This application is a continuation, under 35 U.S.C. § 120, of copending international application No. PCT/EP2019/052774, filed Feb. 5, 2019, which designated the United States; this application also claims the priority, under 35 U.S.C. § 119, of German patent application No. DE 10 2018 206 975, filed May 4, 2018; the prior applications are herewith incorporated by reference in their entirety.

BACKGROUND OF THE INVENTION

Field of the Invention

The invention relates to a method for operating a hearing device and to a hearing device which is in particular configured for performing the method.

Hearing devices, in particular in the form of hearing aids, are used by people with a hearing loss to at least partially compensate for the hearing loss. For this purpose, customary hearing devices regularly comprise at least one microphone for capturing sounds from the surroundings and a signal processing processor used to process the captured sounds and in particular to amplify and/or attenuate them (in particular in a frequency-specific manner) on the basis of the individual hearing loss. The processed microphone signals are passed on by the signal processing processor to an output transducer—usually in the form of a loudspeaker—for output to the ear of the respective hearing device wearer. Depending on the type of hearing loss, the output transducers used also take the form of so-called bone conduction earphones or cochlea implants for mechanical or electrical stimulation of the ear. The term hearing device also covers other devices, however, such as for example headphones, so-called tinnitus maskers or headsets.

In particular hearing aids often have a so-called classifier, which is used to deduce particular, predefined "hearing situations," in particular on the basis of the captured sounds. The detected hearing situation is then taken as a basis for frequently altering the signal processing. Since the existing hearing loss often means that the speech comprehension of the hearing device wearer is impaired, the (signal processing) algorithms stored in the signal processing processor are for the most part designed to bring out the speech utterances of third parties in the captured microphone signals and reproduce them for the respective hearing device wearer in as comprehensible a form as possible. For the purpose of detecting a conversation situation, a voice recognition algorithm is often executed in the classifier. However, such an algorithm becomes inaccurate in situations in which several people are speaking in the immediate surroundings of the hearing device wearer but not all are taking part in the same conversation. In this case, acoustic identification of the people taking part in the same conversation is regularly hampered.

BRIEF SUMMARY OF THE INVENTION

It is accordingly an object of the invention to provide a method of operating a hearing device which overcomes the above-mentioned disadvantages of the heretofore-known devices and methods of this general type and which provides for the improved operation of a hearing device. It is a further object to provide for a hearing device that is specifically configured for performing the novel method.

With the above and other objects in view there is provided, in accordance with the invention, a method of operating a hearing device having an acceleration sensor which, in an intended worn state, is positioned on the head of a hearing device wearer and is configured to measure in three mutually perpendicular measurement axes, the method comprising:

deducing a movement of the hearing device wearer from acceleration data in an acceleration signal output by the acceleration sensor;

deriving from the acceleration data a movement plane of a movement of the hearing device wearer;

ascertaining from the acceleration data a movement axis and a movement direction of the movement; and deducing an occurrence of a rotational movement of the head on a basis of the movement plane, the movement axis, and the movement direction.

The method according to the invention is used for operating a hearing device, in particular a hearing aid. The hearing device has in this case an acceleration sensor, which in the intended worn state is positioned on the head, in particular in or on an ear, of a hearing device wearer. This acceleration sensor is also configured for measurement in three mutually perpendicular measurement axes, of which preferably two are arranged in the intended worn state at least roughly (i.e. not necessarily exactly, in particular— usually because of the individual anatomy—approximately, i.e. with a deviation of up to about 20 or 30 degrees) in a transversal plane of the body of the hearing device wearer. That is to say in particular that these two measurement axes are assigned to the transversal plane.

According to the method, a movement of the hearing device wearer, that is to say in particular whether the hearing device wearer is moving at all, is deduced (in particular during the intended operation of the hearing device) on the basis of acceleration data of the acceleration sensor transported by an acceleration signal. A movement plane of the movement of the hearing device wearer is also derived from the acceleration data—in particular only if a movement has been detected. Furthermore, a movement axis and a movement direction of the movement are ascertained from the acceleration data, and an occurrence of a rotational movement of the head is deduced on the basis of the movement plane, the movement axis and the movement direction.

The term "transversal plane" is understood here and hereinafter as meaning in particular a plane aligned perpendicularly to the (body) longitudinal axis of the hearing device wearer. In a way corresponding to this term, borrowed from medicine, also used here and hereinafter is the term "sagittal plane" or "median plane", which consequently in particular divide a—in an upright posture and looking straight ahead—the body of the hearing device wearer into a left and right part, in the case of the median plane into a corresponding half, and extend perpendicularly to the transversal plane.

The term rotational movement is understood here and hereinafter as meaning in particular a turning of the head about a (body) axis. In principle, such rotational movements of the head in the context of the present description are divided in particular into a yawing movement, a pitching movement and a rolling movement. The term "yawing movement" or "yawing" is in this case understood here and hereinafter as meaning in particular a rotation (turning) of the head about a (body) vertical axis, that is to say in particular about the axis formed by the spinal column (which preferably coincides at least approximately with the vertical). Furthermore, here and hereinafter, in particular the terms "pitching" or "pitching movement" are used for a movement directed up and down about a "pitching axis" preferably lying at least approximately roughly in the transversal plane and in particular connecting the ears of the hearing device wearer, and also "rolling" or "rolling movement" for a sideways directed inclination or tilting of the head about a "rolling axis", which is preferably aligned in the neutral viewing direction (also referred to as the "zero-degree viewing direction") and preferably forms a sectional line of the transversal and sagittal plane level approximately with the ears. The rolling axis consequently also lies at least roughly in the transversal plane.

Optionally, the movement direction is only indirectly determined, for example by means of a rotation angle, for example a yawing angle, which reproduces the extent of the rotational movement (or the yawing movement) about the respective movement axis and also indicates a rotational sense (and consequently the movement direction) by its assigned arithmetic sign.

The fact that at first it is "only" ascertained whether there is a movement of the hearing device wearer at all, optionally the subsequent method steps (for example for detecting the rotational movement) may be omitted. Furthermore, as a result of the determination of the movement plane and also the movement axis and the movement direction, it is advantageously made possible to use only a (single) acceleration sensor, which measures in (or: along) three measurement axes, for detecting the rotational movement, so that it is possible to dispense with the use of conventionally used measuring systems, which use multiple (in particular different) sensors, specifically a combination of acceleration sensors with gyroscopes and/or magnetic field sensors (also referred to as "inertial measuring units"), and the associated comparatively high energy consumption. Furthermore, the detected rotational movement can be used to assist the analysis of hearing situations or the setting of signal processing parameters.

Preferably, the third measurement axis of the acceleration sensor in the intended wearing position is aligned approximately perpendicularly to the transversal plane. Preferably, the acceleration sensor used is an acceleration sensor in which the sensitive elements assigned to the respective measurement axis are integrated. This is advantageous to the extent that such "3D acceleration sensors" can be obtained as integral components.

In a further preferred method variant, the acceleration data are investigated in particular for the occurrence of the yawing movement as a rotational movement. This often reflects a "turning of the head", for example in a conversation situation, so that relevant information can be advantageously used for setting signal processing parameters, in particular for a conversation situation involving multiple participants. Alternatively or in addition, the acceleration data are investigated in particular for the occurrence of the pitching and/or rolling movement.

In a further expedient method variant, the acceleration data are analyzed block by block in successive—possibly mutually overlapping—data frames (that is to say in particular multiple data samples that are captured over a prescribed time window). The length of the respective data frames (i.e. of the assigned time window) is in this case about 0.5 to 1.5 seconds. Preferably, an overlapping of the following time window by the previous time window of approximately 0.25 to 0.75 seconds is used. The length of the (respective) time window is in this case obtained from the knowledge that a customary, deliberate rotational movement (for example the yawing movement) of the head takes about 0.5 seconds to about 1.5 seconds. In particular, in this method variant in each case two or three measured values, which are assigned to the two or three measurement axes, are output by the acceleration sensor at a frequency of about 10-60 Hertz, preferably about 15-20 Hertz. These groups of measured values, referred to as data samples, are in particular intermediately stored in a buffer memory, which can for example hold eight of these data samples (which then form a data frame). A so-called "update rate" of the buffer memory is in this case preferably about two Hertz.

In a preferred method variant, the occurrence of the movement of the hearing device wearer is deduced in particular when a prescribed criterion is satisfied. This criterion must in this case be satisfied in particular by an assigned feature specifically extracted from the acceleration data. In the present case, preferably an (in particular measured, i.e. captured) range of values and/or a variance of the acceleration signal, preferably of the acceleration data contained in the respective analyzed data frame, is used for this purpose as such a feature. Expediently, in this case the occurrence of the movement (and consequently satisfaction of the criterion) is deduced if the manifestation of the feature (that is to say in particular the size of the range of values or the value of the variance) differs from the respectively assigned manifestation indicative of measurement noise. For example, a threshold value comparison is performed for this purpose. This method variant is based on the assumption that, if there is no movement of the hearing device wearer, the acceleration data contain in particular only the value of gravitational acceleration, systematic measurement errors and measurement noise. In this case, with a high degree of probability, in particular only the measurement noise varies within a data frame, so that in particular the variance only reproduces the changing of the measurement noise. In this case, a threshold value comparison is a comparatively simple variant for testing whether the criterion is satisfied by the corresponding feature.

In particular for a preprocessing of the acceleration data, a rotation operator (referred to hereinafter as the "normalization rotation operator") indicative of a rotation of the (three) measurement axes of the acceleration sensor with respect to the transversal plane and/or the horizontal plane is ascertained in the intended worn state of the hearing device from the acceleration data. The normalization rotation operator therefore contains information concerning about which axis and by how many degrees the measuring coordinate system of the acceleration sensor must be rotated in order preferably to be brought into line with the two measurement axes allocated to the transversal plane. Consequently, this normalization rotation operator reproduces a "fixed" linkage of the measuring coordinate system with the body coordinate system (in particular in a neutral posture or at least position of the head).

Here and hereinafter, a rotation matrix, an Euler angle or a comparable operator is used for example as the rotation operator. Particularly preferably, a quaternion (in the previously described method variant referred to as a "normalization quaternion") is however used here and hereinafter as the rotation operator (in each case). For the construction of the corresponding quaternion, in particular a so-called quaternion axis-angle formula is used. The use of quaternions for the (description or parameterization of a) rotation of bodies or data is in this case advantageous in particular with regard to the computational complexity and the stability during the required computational operations.

Preferably, the rotation of the measurement axes is ascertained in the present case on the basis of the cross product and the scalar product between the gravitation vector ascertained from the acceleration data and a "global" gravitation vector. The global (or else: "ideal") gravitation vector is assigned to a "world coordinate system", which is assumed to be generally valid. In this, the global gravitation vector is assumed to be pointing "upward", i.e. in particular vertically and aligned downwardly from the center of the earth (g=[0, 0, 1]), in particular since the acceleration sensor regularly outputs the gravitational acceleration in such a way. For determining the rotation, it is also assumed that, when the head (and in particular the entire body of the hearing device wearer) is in the neutral ("upright") position, the head coordinate system and world coordinate system are aligned the same. In this case, the transversal plane of the body coincides at least approximately with the horizontal plane. By means of the cross product, a tilting axis about which the "rotation" must take place during the correction (or: normalization) is in this case ascertained, and the angle by which the rotation must take place about the tilting axis for the correction is ascertained on the basis of the scalar product. In other words, the cross product or scalar product is calculated between the measured value of the gravitation in the sensor coordinate system and the gravitation vector assumed to be ideal in the world coordinate system and from this the normalization rotation operator, in particular the normalization quaternion, is ascertained.

In an expedient method variant, the acceleration data are smoothed, i.e. possibly existing signal peaks are removed, in particular by a median filter being used. Use thereof, in particular its parameterization, depends in particular on the length of the data frame and is set for example to three data samples. However, further filters are likewise conceivable.

In a preferred method variant, an acceleration directed radially with respect to the head of the hearing device wearer (hereinafter: "radial acceleration" for short) and a tangentially directed acceleration (hereinafter also referred to as "tangential acceleration" for short) are derived from the acceleration data for the corresponding rotational movement. For the—expedient—case where, in the intended worn state, one of the measurement axes assigned to the transversal plane is also aligned—at least approximately—along a tangent of the head, the acceleration data assigned to this measurement axis—when there is a yawing movement of the head—expediently display a high proportion of tangential acceleration. In this case, the second measurement axis assigned to the transversal plane displays in particular a high proportion of radial acceleration. Therefore, in an expedient subvariant, a time characteristic of the tangential acceleration and the radial acceleration ascertained by means of the measurement axes assigned to the transversal plane is considered and evaluated as a feature indicative of the yawing movement. Used and considered in this case as a criterion for the occurrence of the yawing movement is whether the time characteristic of the tangential acceleration has two oppositely directed local extremes (that is say for example a local maximum and a local minimum) in succession within a prescribed movement time window. In particular, consideration is given in this case to whether the tangential acceleration assumes values with opposite arithmetic signs in the time characteristic at these two extremes. This is based on the knowledge that, when the head yaws, the tangential acceleration initially indicates an "actual" acceleration and subsequently indicates a "negative" acceleration (specifically when the head is slowed down) with a respectively assigned swing (the respective extreme) in the time characteristic. In particular on the basis of the orientation of the measurement axis assigned to the tangential direction relative to the actual direction of movement, the tangential acceleration therefore for example initially assumes positive values and "changes" to negative values when the head is slowed down. When the head yaws in the opposite direction, the values of the tangential acceleration correspondingly change from negative to positive. The movement time window in this method variant preferably matches the duration of a—in particular in the case of a group conversation—customary head turning movement and preferably has values of between 0.25 and 1.5 seconds, in particular from 0.5 to 1 second. Preferably, the movement time window is "opened" (i.e. the monitoring thereof is started) if a sufficiently significant change in the values of the tangential acceleration is detected. The movement time window advantageously achieves a (temporal) limitation of consideration of the main feature, in particular of the time characteristic of the tangential acceleration, which means that "acceleration events" which, with a high degree of probability, are not attributable to turning of the head (that is to say yawing) because of their comparatively long duration are disregarded. The radial acceleration is also recognized to be linked with the centripetal force (or the oppositely directed centrifugal force) inevitably occurring during a rotational movement (in particular the yawing movement), so that—in a temporal evaluation of the radial acceleration it is expediently investigated as a further feature whether there is a local extreme of the radial acceleration within the movement time window. It is advantageously possible in conjunction with the two local extremes of the tangential acceleration to derive a comparatively high probability of there being not only a rectilinear movement along one of the measurement axes but also in fact a rotational movement, in the case of the measurement axes assigned to the transversal plane the yawing movement of the head.

The analysis described above of the acceleration data with regard to the yawing movement can correspondingly also be applied to the rolling and/or pitching movement. In this case, measurement axes that can be used as radial or tangential acceleration axes for the respective movement plane during rolling or pitching are in each case evaluated. Thus, the measurement axes to be evaluated during rolling are in particular by the measurement axes arranged approximately in a frontal plane of the body, and during pitching the measurement axes arranged approximately in the sagittal plane. In the latter case, it is advantageous to arrange the acceleration sensor on the hearing device in such a way that, in the intended worn state the measurement axis assigned to the vertical (in particular the approximately vertically aligned measurement axis) does not intersect with the pitching axis of the head. In this case, this measurement axis is aligned parallel to a tangent of the head in the pitching direction. In both cases—i.e. in the case of evaluation with regard to the rolling movement or pitching movement—the influence of gravitational acceleration is expediently compensated, in particular dynamically, since this continually changes depending on the angle of rotation of the head. The relationship between the sensor coordinate system and the world coordinate system ascertained by means of the normalization rotation operator is optionally used for this purpose. Also optionally—in particular when using a binaural hearing device system with two hearing devices of substantially the same construction, and consequently also two acceleration sensors—a binaural difference of the acceleration data of the two sensors is used in order to compensate for the influence of gravitational acceleration.

In a preferred development, the movement plane is constructed from the radial acceleration and the tangential acceleration, in particular by these being plotted against one another in a diagram. The curve of the radial acceleration and the tangential acceleration that is plotted in this case specifically spans the movement plane. The movement plane (and consequently also the entire acceleration data contained in the acceleration signal) is then rotated—in particular using a rotation operator, preferably a quaternion—in such a way that it is aligned parallel to a measurement plane defined by the two measurement axes used for capturing the radial acceleration and the tangential acceleration. As a result, the radial acceleration and the tangential acceleration are linked with the two measurement axes defining the measurement plane, in particular correspondingly aligned parallel to them. For the case where the occurrence of the yawing movement is investigated, as described above the measurement axes that are used for capturing the radial acceleration and the tangential acceleration are in particular the measurement axes assigned to the transversal plane.

Since the acceleration sensor is configured for measuring in the three measurement axes perpendicular to one another, as a result of gravitation the acceleration data, and therefore in particular also the movement plane, for the yawing movement are displaced by a corresponding amount from the measurement plane assigned to the transversal plane. Preferably, therefore, after the "correct rotation" of the movement plane (also: "yawing plane"), a projection of this movement plane into the measurement plane takes place parallel to the transversal plane. In particular, by this method variant, the acceleration data are transformed from 3D to 2D. As a result of the rotation of the movement plane, for the further evaluation, the acceleration data are preferably loss-free, at least virtually loss-free, in the measurement plane described above, so that a particularly precise subsequent evaluation is made possible on the basis of the acceleration data, in particular the movement plane derived therefrom.

In an expedient development, for the rotation of the movement plane, the tilting of the movement plane with respect to the measurement plane (described above) is ascertained by a curve, preferably an ellipse, being fitted into a characteristic of the radial acceleration and tangential acceleration plotted against one another (i.e. fitted into the characteristic or the curve). For the surface area of the fitted ellipse ("area of the ellipse"), a normal vector is subsequently determined and this vector, in particular the normal vector arranged at the centroid of the area of the ellipse) is assumed as the movement axis (that is to say in particular as the yawing, rolling or pitching axis). For this movement axis (that is to say for the normal vector), then a tilting angle with respect to the measurement plane is ascertained (in particular with respect to the normal vector of the measurement plane, preferably in the case of the measuring coordinate system aligned with the transversal plane with respect to the normal vector of the transversal plane or with respect to the (possibly global) gravitation vector). Particularly preferably, the tilting of the movement axis ascertained in this way is used to construct a correction rotation operator, in particular a correction quaternion, by means of which the movement plane can be easily rotated onto the measurement plane.

Particularly preferably, a movement rotation operator, in particular movement quaternion, for the current movement of the head of the hearing device wearer is also constructed by means of the movement plane, in particular by means of the fitted ellipse and the movement axis. For this purpose, a rotation angle is ascertained from the assigned tangential acceleration, in particular for the detected rotational movement. In particular, a yawing angle—which indicates the rotation of the head about its vertical axis (i.e. the movement axis described above)—is ascertained here as the rotation angle from the tangential acceleration (which in turn is preferably determined on the basis of one of the measurement axes assigned to the transversal plane). Optionally, a rolling angle and/or a pitching angle is ascertained as the rotation angle (in addition or as an alternative to the yawing angle) from the respectively assigned tangential acceleration. In particular, for this purpose the corresponding tangential acceleration is integrated twice, for example by means of a high-order Runge-Kutta method. The result of the integration is subsequently preferably divided by the head radius (optionally stored heads measured during an initial fitting of the hearing device or measured as for example a median of a database), in order to obtain the "new" or current angular position of the head on the "virtual" unit circle. Expediently, during an (initial) fitting of the hearing device to the hearing device wearer, also respectively determined for each of the rotational movements described above is a rotation radius, with which the acceleration sensor is arranged relative to the respective rotation axis, that is to say the yawing axis, the rolling axis or the pitching axis. In particular in the case of the yawing and rolling movement, this rotation radius regularly corresponds to the head radius for this rotational movement and is in this case optionally used for the determination of the angular position. In the case of the pitching movement, this rotation radius is usually smaller than the actual head radius, since the acceleration sensor, in particular the hearing device containing it, is regularly worn on or in the ear, and is therefore positioned comparatively close to the pitching axis.

Alternatively, within the scope of the invention, the evaluation of the movement described above, in particular checking for the occurrence of the rotational movement, preferably the yawing movement, and the ascertainment of the new angular position, may also be carried out by means of other estimating methods, for example by means of regression methods such as a nonlinear autoregressive network with exogenous inputs ("NARX"), a recurrent neural network ("RNN") or a "standard least squares" regression method. Feature-based classification methods are also conceivable within the scope of the invention.

To save computational capacity during the operation of the hearing device, in an expedient development the rotation angle for the rotational movement of the head (in particular the yawing angle for the yawing movement) is only ascertained if the occurrence of the corresponding rotational movement (that is to say for example the yawing movement) has also actually been detected.

Expediently, in particular a surface area (in particular the area) of the ellipse described above is ascertained as an (optionally further) feature for the occurrence of the rotational movement, in particular the yawing movement, the rolling and/or pitching movement of the head of the hearing device wearer, and the occurrence of the rotational movement is deduced on the basis of the manifestation of the feature (i.e. the value of the area). The area of the ellipse is in this case indicative of the degree of the rotational movement. In particular, with increasing area, the degree of the rotational movement likewise increases, so that for example a threshold value comparison can be carried out for detecting the rotational movement of the head. For example, a rotational movement (in particular just a yawing movement) of the head differs by the assigned degree from a movement of the body as a whole (for example standing up, walking, sitting down, etc.) or other head movements, such as for example a lowering of the head when eating, since in these cases usually lower values are captured for the tangential acceleration. This therefore allows for example a yawing movement of (in particular only) the head to be distinguished from other turning movements of the body.

As an alternative or additional feature for the occurrence of the rotational movement (for example the yawing movement) of the head of the hearing device wearer, in a further expedient method variant an assigned intensity (or else "degree") and/or an intensity of a tangential velocity is derived from the tangential acceleration. In particular, the respective intensity is in this case ascertained by determining the norm of the respective vector assigned to the acceleration or the velocity, or of the respective quaternion, for example by means of scalar multiplication by itself. If the tangential acceleration or the tangential velocity has a prescribed value, this is used—in particular by analogy with the above evaluation of the area of the fitted ellipse—in particular as a criterion for the occurrence of the rotational movement and/or also for delimitation with respect to a movement of the body as a whole of the hearing device wearer.

In order to reduce and/or avoid systematic errors, in particular when ascertaining a yawing movement, preferably a current yawing position of the head, in an advantageous method variant, in particular for the case where no movement of the hearing device wearer is detected, a correction is carried out, in particular first an identification of a pitching angle and/or a rolling angle of the head. This correction or identification therefore preferably takes place in so-called static data frames. Systematic influences (a so-called bias), which are often subject to changes caused by temperature, are in this case recognized as changing extremely slowly in comparison with the length of the respective data frame (of the order of magnitude of about 1 second), so that for a data frame they can be assumed as a constant measured value displacement ("offset"). Therefore, apart from this offset, the acceleration data assigned to the static data frames only contain in particular the influence of gravitation and an additional measurement noise with an average value of zero (which can be represented for example by white Gaussian noise).

Preferably, first an average value for the acceleration data is formed within the respective static data frame, whereby only the bias or offset described above is contained in the acceleration data, and therefore identified. This bias can then be removed, in particular in following data frames, preferably by subtraction.

Furthermore, a revision of the acceleration data to include the influence of gravitation is expediently carried out (before or after the averaging described above). In particular, for this purpose the influence of gravitational force on the respective measurement axes—which with a known alignment of the measurement axes with respect to the world coordinate system is known—is subtracted.

In a preferred configuration of the method variant described above, for the correction or identification of the pitching or rolling angle, the acceleration data, in particular the assigned average value, preferably its assigned vector of the current (static) data frame, are rotated by means of the alignment information of the previous data frame (for example by means of the correction rotation operator or the correction quaternion set up for it, or some other rotation operator set as representative of the alignment of the head in the previous data frame), in particular in order to be able to align the acceleration data parallel to the measurement plane or transversal plane. Subsequently, for the acceleration data rotated in this way (and "estimated"), preferably a residual deviation of the alignment in comparison with the previous data frame is in each case ascertained by means of the cross product and the scalar product, in particular with respect to the gravitation vector of the previous data frame (or alternatively with respect to the global gravitation vector), and therefore also indirectly with respect to the actual alignment of the measurement axes. Specifically, in a way comparable to the previous description, a correction axis and a correction angle are therefore ascertained.

By means of this correction axis and the correction angle (that is to say by means of the ascertained residual deviation), a deviation rotation operator, in particular a deviation quaternion, is preferably constructed, reproducing the tilting of the acceleration data with respect to the previous data frame and consequently also the deviation with regard to the pitching and rolling angle with respect to the previous data frame. Since there should not be any movement in a static data frame, the respective deviation with regard to the pitching and rolling angle is used in particular as a correction variable.

In a further expedient method variant, in particular for the case were no movement of the hearing device wearer is detected, a correction of the yawing angle is carried out. Preferably, for this purpose a main viewing direction, which conventionally lies in a sagittal plane, specifically in the median plane, of the hearing device wearer, is adjusted (also: drifted) away from this sagittal or median plane of the body of the hearing device wearer toward a current viewing direction. In other words, the current value of the ascertained yawing angle is drifted in the direction of zero. As a result, the current viewing direction as the main viewing direction is adapted in particular over a time period of at least one minute, in particular over several minutes. This is of advantage in particular in situations of a lecture or meeting (in particular involving a presentation), in which the hearing device wearer is looking obliquely to the sagittal plane in relation to the other people involved in a conversation over a comparatively long time period (at least one minute, in particular several minutes) (with comparatively little variation of the position of his head) or in relation to a screen, and only occasionally turns his head toward other participants, and in particular for a short time. Furthermore, as a result, possible errors during an "initialization", in particular of a rotation operator, in particular a quaternion, which is indicative of the orientation of the head of the hearing device wearer (and for which a yawing angle of zero degrees is preferably assumed as the main viewing direction in the initialization, but does not necessarily have to coincide with the median plane) can also be compensated ("post-corrected"). Such errors may for example occur as a result of an error of an absolutely measuring position sensor, for example a magnetometer.

For the above correction of the yawing angle, preferably a rotation operator referred to as a "yaw-free rotation operator" is ascertained. For the case where the alignments and rotations of the head or the hearing device in space are described by means of quaternions, in particular a "yaw-free quaternion" is ascertained. In particular, for this purpose the yawing angle is set to zero degrees with the deviation rotation operator (in particular with the deviation quaternion) described above and constructed by means of the correction axis and the correction angle for the correction of the pitching or rolling angle. In particular, this yaw-free rotation operator is therefore ascertained on the basis of the (optionally global) gravitation vector. Subsequently, spherical interpolation is carried out between this yaw-free rotation operator and the deviation rotation operator (with which the yawing angle is not changed) and preferably the resultant rotation operator is set as the new deviation rotation operator. The step size for the interpolation is in this case chosen for example such that the acoustic scene (also: hearing situation) can still be sufficiently well adapted, for example in such a way that the interpolation leads to a comparatively slow drift of the yawing angle. With a current yawing angle of for example 45 degrees, for a slow drift toward zero degrees the step size is set for example to one percent. After 100 interpolation steps, the yawing angle—when the head is unmoved—would then have drifted to zero degrees. With a block length (or length of the respective data frame) of one second, such a complete drift therefore corresponds to a time of 100 seconds. Optionally, the ("adaptive") percentage for the interpolation (and also a possibly existing minimum step by which the yawing angle is in any event to be drifted) on the basis of (in particular proportional to) a size of an error of the estimation of the planes (in particular the ascertainment of the movement plane or the fitting of the ellipse into the characteristic of the radial and tangential acceleration, described by a residual error ascertained during the "fit"). Furthermore, the percentage is optionally also varied on the basis of a frequency of the yawing movement of the head during the last minutes (for example the last 2 to 4 minutes). In this case, for example when there are comparatively many detected yawing movements, it is assumed that there are correspondingly many (accumulated) errors, and therefore a higher percentage (for example two percent) is set for the compensation. In addition or as an alternative, in the interpolation preferably a maximum range of values is prescribed for the yawing angle of 180 degrees (i.e. in particular of +/−90 degrees), since, for just turning of the head (i.e. without additional turning of the upper body), no greater (at least no significantly greater) rotations of the head are possible.

In a preferred method variant, a new orientation rotation operator (in particular an orientation quaternion) is also ascertained for the determination of the current alignment of the head, in particular for each analyzed data frame. For this purpose, the previous (i.e. assigned to the previous data frame) orientation rotation operator is offset against the previously described movement rotation operator (which was constructed in response to a detected movement, in particular a detected yawing movement) or against the previously described deviation rotation operator (which was correspondingly ascertained in a static data frame). In particular when using quaternions as the rotation operator, the previous orientation quaternion is combined with the movement or deviation quaternion by means of a quaternion multiplication. By means of this (new) orientation rotation operator, an ascertainment and subtraction of the gravitation that is as free from errors as possible is for example possible, since when only one acceleration sensor is used knowledge of the actual spatial position is advantageous in order to be able to determine the gravitation precisely (in particular without the influence of other accelerations).

As is evident from the previous description, preferably created as the respective rotation operator, that is to say in particular as the normalization, correction, deviation, movement and orientation rotation operator, is the corresponding quaternion, that is to say in particular the normalization, correction, deviation, movement or orientation quaternion.

Particularly preferably, an upright and "neutral" position of the head, that is to say in particular a coincidence of the zero-degree viewing direction with the median plane (and in particular looking straight ahead, i.e. preferably directed along the transversal plane) is assumed for the initialization of the orientation rotation operator, that is to say in particular as the first orientation rotation operator. For the respective yawing, pitching and rolling angles, in this case a value of zero is respectively set. In the case of the orientation quaternion, in this case in particular the unit quaternion is used. It is consequently assumed here that a yawing angle of zero degrees represents the zero-degrees viewing direction (or main viewing direction), though the yawing angle does not necessarily also have to coincide with the median plane (depending on the actual alignment of the head). In particular in combination with the correction of the yawing angle described above (in particular the drift), errors between the actual alignment of the head and the median plane can thus be avoided or at least post-corrected (in the way described above). There is consequently advantageously no need for an exact alignment of the zero-degree viewing direction in relation to the median plane.

Preferably, the orientation rotation operator of the previous data frame is used within the correction or identification of the pitching or yawing angle described above for the rotation of the average value, in particular of the average-value vector of the following static data frame (that is to say as previous alignment information).

In an expedient method variant, an (in particular spatial) viewing-direction probability distribution is created on the basis of the (in particular respective new) orientation rotation operator (preferably the orientation quaternion). This indicates in particular for each angular position (or "rotational position"; in the case of the yawing movement also: "yawing position") of the head (in particular starting from the main viewing direction, which is in particular assigned the zero-degree position) a probability of whether the actual viewing direction of the hearing device wearer ran along an angle assigned to the respective angular position within the past time (for example during the last 1 to 5 minutes). In particular in a conversation situation involving multiple participants, this viewing-direction probability distribution will have multiple swings ("peaks"), associated with different angular positions, in particular yawing positions, since the hearing device wearer in such a situation will turn his head alternately to the various participants in the conversation. Consequently, the viewing-direction probability distribution also reproduces a spatial area of interest, in which with a high degree of probability the participants in the conversation or other sound source of interest to the hearing device wearer are located.

For creating the viewing-direction probability distribution, in a preferred development first a Gaussian normal distribution with a prescribed standard deviation is set on the basis of the main viewing direction. Values of about 5 to 25 degrees, in particular 10 to 15 degrees are used in this case for the standard deviation. For the current angular position (in particular yawing position), prescribed in particular on the basis of the rotation angle (in particular yawing angle) ascertained in the way given above, a new normal distribution with a prescribed standard deviation (in particular in turn with the aforementioned values) is subsequently set. Optionally, in particular before the setting of the new normal distribution, all of the previously set probability values for the previously occurring angular positions are reduced, each by the same prescribed value. Preferably, the newly set normal distribution is likewise weighted by a factor corresponding to the reduction of the previous probability values, so that the accumulated sum of all the angular positions plotted in the viewing-direction probability distribution gives one. This step achieves the effect in particular of (preferably increasingly) "forgetting" previous (and in particular "old") angular positions by the probability of the occurrence of an angular position "wandering out" of the viewing-direction probability distribution if there is no repetition or sufficient repetition. This advantageously leads to a dynamic (in particular automatic) adaptation to the actual situation in which the hearing device wearer currently finds himself. The advantage of the ascertainment of the viewing-direction probability distribution described above is also in particular that not only a "specific" value of the current angular position (in particular of the current yawing angle) is used, but in each case a band of multiple angular values that are distributed about the ascertained (or else: estimated) value of the current rotation angle (in particular the current yawing angle). As a result, errors in the ascertainment of the current value of the rotation angle described above have a comparatively minor effect, in particular since they are "spread out" over a greater angular range. Furthermore, it should regularly be the case that the hearing device wearer does not have to adopt the same angular position (in particular yawing position) each time he looks at a person involved in a conversation, since the wearer or the other person move, and also the, in particular acoustic, area of interest usually does not run exactly along the viewing direction. Therefore, the viewing-direction probability distribution is comparatively robust with respect to errors.

In an expedient development, the value of the standard deviation for the Gaussian normal distribution is variably prescribed. For example, the value of the standard deviation is in this case adapted to a possible error in the ascertainment of the yawing angle. Expediently, the standard deviation (the value thereof) is in this case adapted concurrently, so that when there are small errors the value is set correspondingly small, and vice versa. As a result, comparatively great errors are given as little weight as possible and the meaningfulness of the viewing-direction probability (at least for this angular position) becomes in particular "vaguer". A quality of the fit of the plane, in particular the fit of the ellipse, to the acceleration data is used for example as a measure of the error. This quality is depicted in particular by a residual error of the fit of the plane or of the ellipse.

In an expedient method variant, the information concerning the rotational movement, in particular the yawing movement, of the head of the hearing device wearer, for example the current yawing position, in particular the viewing-direction probability distribution, is used for adapting a signal processing algorithm for a group discussion situation. In particular, it is ascertained on the basis of the viewing-direction probability distribution in which range of values of the respective rotation angle (in particular the yawing angle) the most frequent views (involving yawing of the head) of the hearing device wearer lay, and in response for example an opening area of a directional cone is correspondingly adapted (for example widened or narrowed). Optionally, the information concerning the rotational movement is in this case used in addition to an acoustic classifier by means of which the occurrence of a conversation situation involving multiple participants itself is ascertained, preferably in order to verify and/or improve the result. For example, in a situation involving multiple conversations between persons alongside one another, it is often not possible by means of the acoustic classifier to establish with sufficient certainty which portion of speech captured by means of a microphone system of the hearing device belongs to the conversation.

For example, in a restaurant it therefore cannot be ascertained sufficiently certainly whether the hearing device wearer is conversing only with the opposite and to the right of himself, or whether the persons to the left of the hearing device wearer are likewise participating in this conversation. On the basis of the viewing-direction probability distribution, it can be advantageously ascertained whether the hearing device wearer turns his head toward all of the potential participants in the conversation or only some of them. In the latter case, there is a high probability that the other persons are not taking part in this conversation.

The hearing device according to the invention has the acceleration sensor described above and also a processor, which is configured for performing the method described above, in particular automatically.

The processor is in this case optionally designed as a non-programmable electronic circuit. Alternatively, the processor is formed by a microcontroller, in which the functionality for performing the operating method according to the invention is implemented in the form of a software module.

The conjunction "and/or" is intended to be understood here and hereinafter in particular such that the features linked by means of this conjunction can be formed both together and as alternatives to one another.

Other features which are considered as characteristic for the invention are set forth in the appended claims.

Although the invention is illustrated and described herein as embodied in a Method for operating a hearing device, and hearing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

Mutually corresponding parts and variables are always provided with the same reference signs throughout the figures.

DETAILED DESCRIPTION OF THE INVENTION

Figure 1:
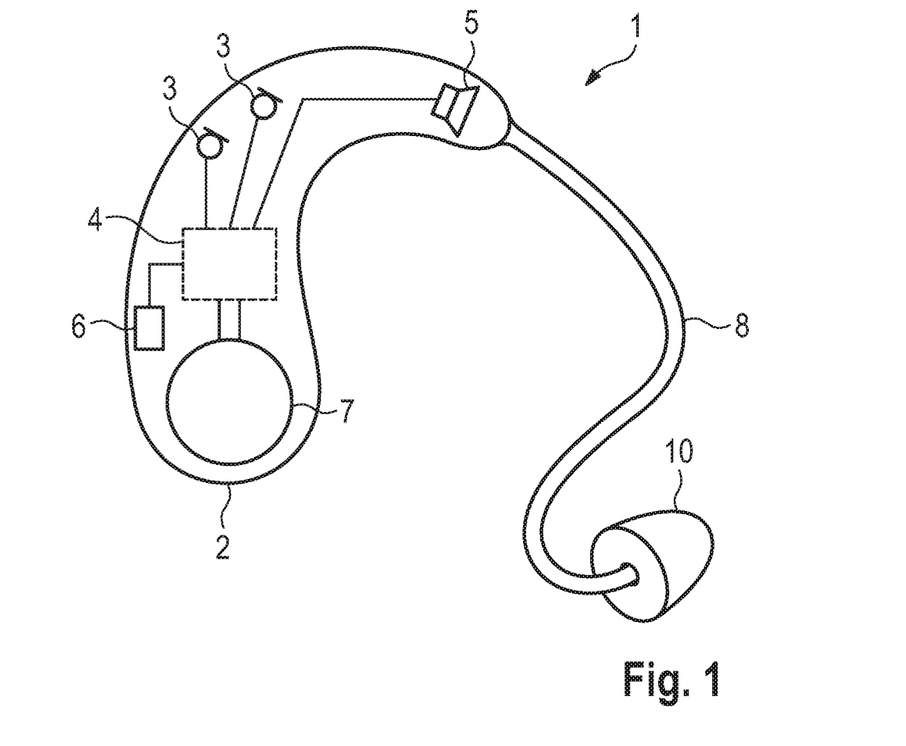
FIG. 1 shows a schematic circuit diagram of a hearing device.

Referring now to the figures of the drawing in detail and first, in particular, to FIG. 1 thereof, there is shown a hearing device 1, specifically a so-called behind-the-ear (BTE) hearing device. The hearing device 1 comprises a (hearing device) housing 2, in which multiple electronic components are arranged. The electronic components of the hearing device 1 include two microphones 3, which are configured for detecting sounds from the surroundings of the hearing device 1. In addition, the electric components of the hearing device 1 include a signal processor 4, which is configured to process the sounds captured by means of the microphones 3 and to output them to a loudspeaker 5 for output to the ear of a hearing device wearer. To detect the physical position of the hearing device 1, the latter additionally comprises an acceleration sensor 6 interconnected with the signal processor 4. For the purpose of supplying power to these electronic components, additionally arranged in the housing 2 is a battery 7, which in the present exemplary embodiment is specifically formed by a rechargeable battery. To conduct the sound produced by the loudspeaker 5 to the ear of the hearing device wearer, connected to the housing 2 is a sound tube 8 which, in the intended worn state on the head 9, specifically on the ear of the hearing device wearer (cf. FIG. 2), is inserted into the auditory canal of the hearing device wearer with an earpiece 10.

Figure 2:
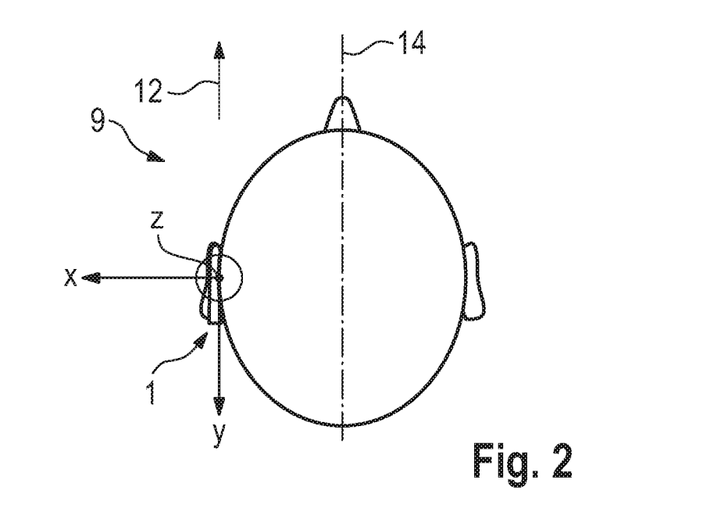
FIG. 2 shows a schematic view from above of a head of a hearing device wearer with the hearing device worn on the ear as intended.

The acceleration sensor 6 is configured for three-dimensional measurement and, for this purpose, has three mutually perpendicular measurement axes x, y and z (see FIG. 2). In this case, the acceleration sensor 6 is arranged in the housing 2 of the hearing device 1 such that, in the intended worn state on the head 9 and when the body posture of the hearing device wearer is upright, the measurement axis z coincides at least approximately with the vertical direction. The measurement axis x is in this case directed radially in relation to the head 9, specifically radially to the outside. The measurement axis y is in this case directed tangentially in relation to the head 9 and backward—i.e. parallel and opposite to a zero-degree viewing direction 12, which in a basic alignment is aligned parallel to a sagittal plane, specifically parallel to the median plane 14. The two measurement axes x and y are in this case assigned to a transversal plane of the hearing device wearer.

The signal processor 4 is configured to use an acoustic classifier, implemented in the signal processor 4 as an algorithm, to deduce a conversation situation (i.e. a conversation involving at least two people) from the sounds captured by means of the microphones 3 and then to adapt the signal processing accordingly. For example, this involves an opening angle of a directional microphone formed by means of the two microphones 3 being set such that all voice components arriving at the microphones 3 from the surroundings, specifically the source locations of these voice components, lie within the opening area of the directional microphone. In order to be able to adapt the signal processing in such a conversation situation even more precisely, specifically in order to be able to set the opening angle such that only the persons actually involved in the conversation (who each are a source location of a voice component) are within the opening area of the directional microphone, the signal processor 4 performs a method that is explained in more detail below on the basis of FIG. 3.

Figure 3:
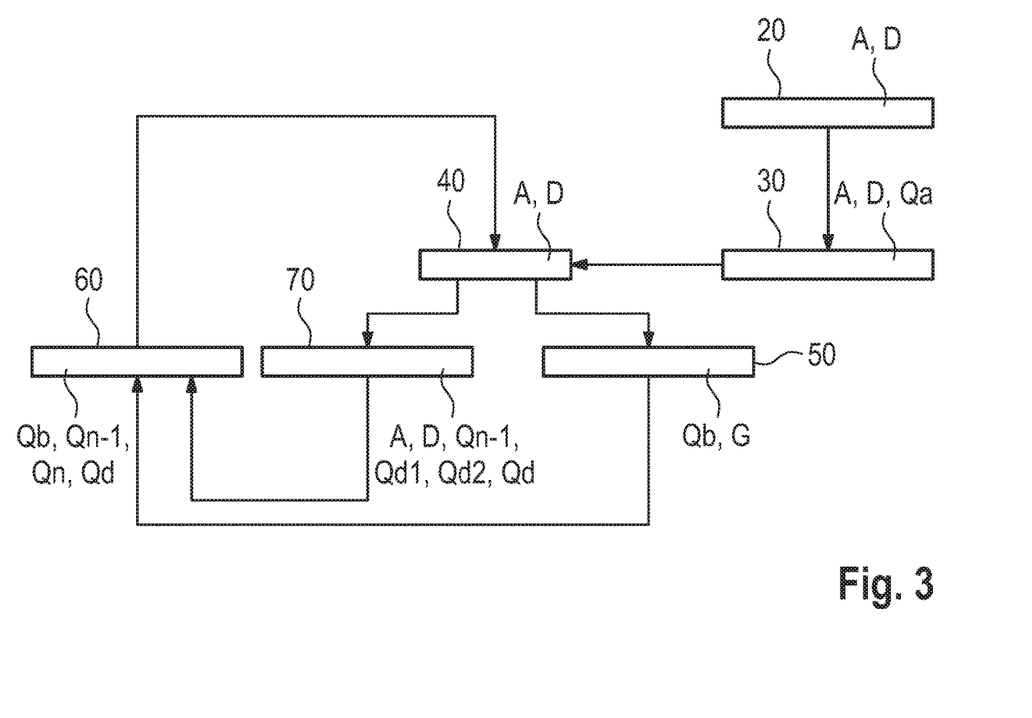
FIG. 3 shows a schematic flow diagram of a method for operating the hearing device.

In a first method step 20, the measured values ascertained by the acceleration sensor 6—which are output in samples of three measured values in each case, one of which in turn is in each case assigned to one of the measurement axes x, y and z—are stored as "raw" acceleration data A in a buffer store (which is integrated in the signal processor 4). The buffer store, or buffer memory, or simply buffer, is in this case designed for moving buffer-storage of eight such samples, which in each case form a data frame D and are captured over a time window of 1.3 seconds.

The raw acceleration data A contain inter alia information concerning an acceleration when there is a rectilinear movement directed straight ahead (i.e. along the meridian plane 14) (for example walking and the like), concerning an acceleration directed radially in relation to the head 9 (referred to hereinafter as "radial acceleration ar") and concerning an acceleration directed tangentially in relation to the head 9 (referred to hereinafter as "tangential acceleration at"). The radial acceleration ar occurs as a result of the centrifugal force when there is a turning of the body and/or head—independently of the direction of turning or rotation and consequently also independently of the assigned axis of rotation. The tangential acceleration at likewise occurs when there is a rotation of the head 9, specifically when there is "initial turning" and "slowing down" of the head 9. Hereinafter, the radial and tangential accelerations ar and at are used and described with reference to a rotation referred to as a "yawing movement" of the head 9 about its vertical axis, which is approximately perpendicular to the transversal plane and, as an axis of rotation, is in this connection also referred to as the "yawing axis". On account of the assignment of the measurement axes x and y to the transversal plane described above, under certain preconditions (specifically when there is a yawing movement), the measured values assigned to the measurement axis x can be allocated to the radial acceleration ar and the measured values assigned to the measurement axis y can be correspondingly allocated to the tangential acceleration at. Furthermore, the raw acceleration data A contain a bias (or: "bias component"), which usually fluctuates over time as a result of temperature influences, and also influences of different measuring sensitivity for the individual measurement axes x, y and z. Furthermore, the acceleration data A contain the influence of gravitational acceleration g (also: gravitation).

In a subsequent method step 30, the measurement axes x, y and z of the acceleration sensor 6, specifically therefore the sensor coordinate system, are normalized to the coordinate system assigned to the head 9. For this purpose, the scalar product and the cross product between the gravitation vector ascertained from the acceleration data A and the global gravitation vector gw, assigned to a universal coordinate system referred to as the "world coordinate system," is ascertained during a phase in which the head 9 is kept straight ahead with an upright body posture (looking along the meridian plane 14)—specifically during an adaptation of the hearing device 1 to the hearing device wearer. The global gravitation vector gw is in this case based on the assumption that the gravitation points "upward", and consequently has the form gw=[0, 0, 1]. The scalar product in this case reproduces a tilting angle between these vectors and the cross product a tilting axis is effective for this tilting angle. The tilting axis and the tilting angle are subsequently used to construct a rotation operator, specifically a quaternion referred to as the "normalization quaternion Qa", which reproduces a linkage of the sensor coordinate system with the world coordinate system and by means of which the sensor coordinate system, and consequently the raw acceleration data A, are rotated onto the world coordinate system ("normalized"). The normalization quaternion Qa is in this case constructed on the basis of a so-called axis-angle representation, specifically that according to Euler every rotation can be represented by an angle about a fixed axis:

$$Qa = \begin{pmatrix} \cos\frac{\theta}{2} \\ u_x \sin\frac{\theta}{2} \\ u_y \sin\frac{\theta}{2} \\ u_z \sin\frac{\theta}{2} \end{pmatrix} \quad (1)$$

where $u_x$, $u_y$, $u_z$ indicate the respective axis.

Furthermore, in an optional exemplary embodiment, a calibration, specifically an ellipsoid calibration, is performed. In the ellipsoid calibration, it is assumed that the norm of the vector of gravitational acceleration g gives one, so that no explicit knowledge of the alignment of the measurement axes x, y and z of the acceleration sensor 6 is required. However, other calibration methods, in which the actual alignment of the measurement axes x, y and z of the acceleration sensor 6 are ascertained, may equally be used. For example, for calibrating for specific positionings of the hearing device 1, and therefore of the measurement axes x, y and z of the acceleration sensor 6, or only of the acceleration sensor 6 (already before the installation of the acceleration sensor 6 in the housing 2), the respective, assigned acceleration data A are captured and used for determining calibration data for the influences of bias and sensitivity. The specific positions are in this case usually "set" by means of a handling device (also: "manipulator"). The respective measuring points assigned to the positions lie in this case on a three-dimensional ellipsoid surface—usually a unit sphere deformed into an ellipsoid as a result of the different measuring sensitivities and assigned to the norm of the acceleration signal. This calibration allows sufficiently precise compensation for the influences of bias and sensitivity during a "static" data frame (with which no movement is detected).

Furthermore, in method step 30, the acceleration data A of a data frame D are pre-processed. For this purpose, a noise reduction takes place by means of a median filter with a window length of three samples, in order to filter out sensor noise and individual signal peaks.

In a further method step 40, the (then pre-processed) acceleration data A are analyzed within the respective data frame D and checked for the occurrence of a movement. For this purpose, a range of values of the acceleration data A contained in the data frame D, specifically the distance between maximum and minimum values of the acceleration data, is ascertained. In addition (or in another exemplary embodiment alternatively), a variance of the acceleration data A of each data frame D is also ascertained. A threshold value comparison is used to ascertain whether the range of values and/or the variance differs sufficiently from a corresponding range of values and a corresponding variance value of a measurement noise that dominates the acceleration signal or the acceleration data A when there is no movement of the hearing device wearer.

Figure 4:
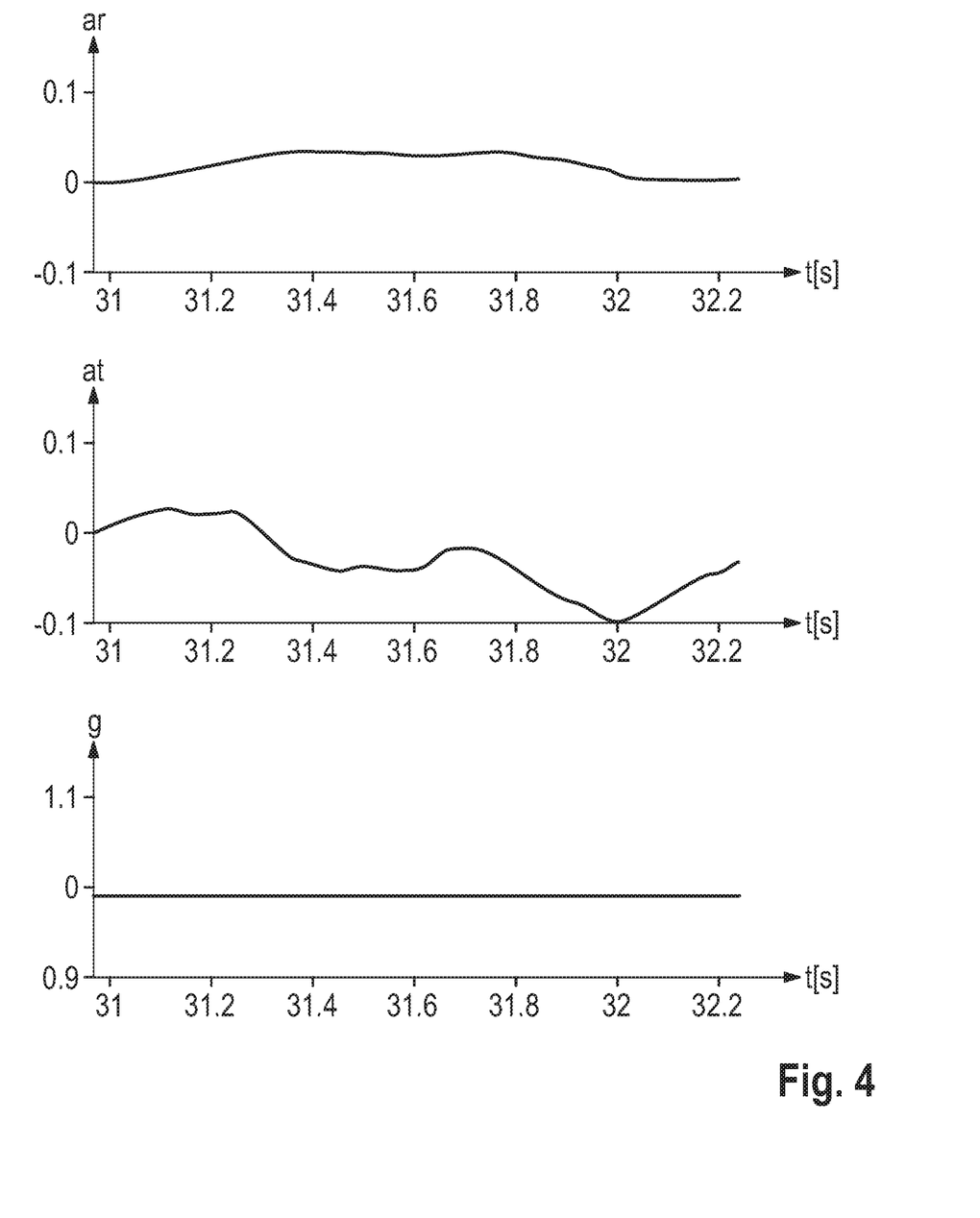
FIG. 4 shows three schematic diagrams one above the other of in each case a characteristic of an acceleration over time assigned to one of three measurement axes perpendicular to one another of the acceleration sensor of the hearing device.

For the case where a movement of the hearing device wearer is detected, the acceleration data A are investigated in a method step 50 for the occurrence of a yawing movement of the head 9. When there is a yawing movement of the head 9 (i.e. a rotation about an axis perpendicular to the transversal plane, usually about the axis formed by the spinal column), this produces the characteristic schematically depicted in FIG. 4 over time t of the radial and tangential accelerations ar, at assigned to the measurement axes x, y and z (normalized to the world coordinate system) and representing the centrifugal force and the tangential force during the yawing movement, as well as gravitational force g, which is plotted as a positive value here. When there is a yawing movement to the left, the tangential acceleration at passes through a first extreme, which indicates the beginning of the yawing movement, and subsequently a second extreme with an opposite arithmetic sign, which indicates the slowing down of the head 9 toward the end of the yawing movement. In parallel, the radial acceleration ar for the centrifugal force likewise exhibits a single extreme. The time period of the yawing movement lies here within about 1.2 seconds. Already this characteristic of the radial and tangential accelerations ar and at is used in an optional exemplary embodiment as a criterion for the occurrence of the yawing movement.

Figure 5:
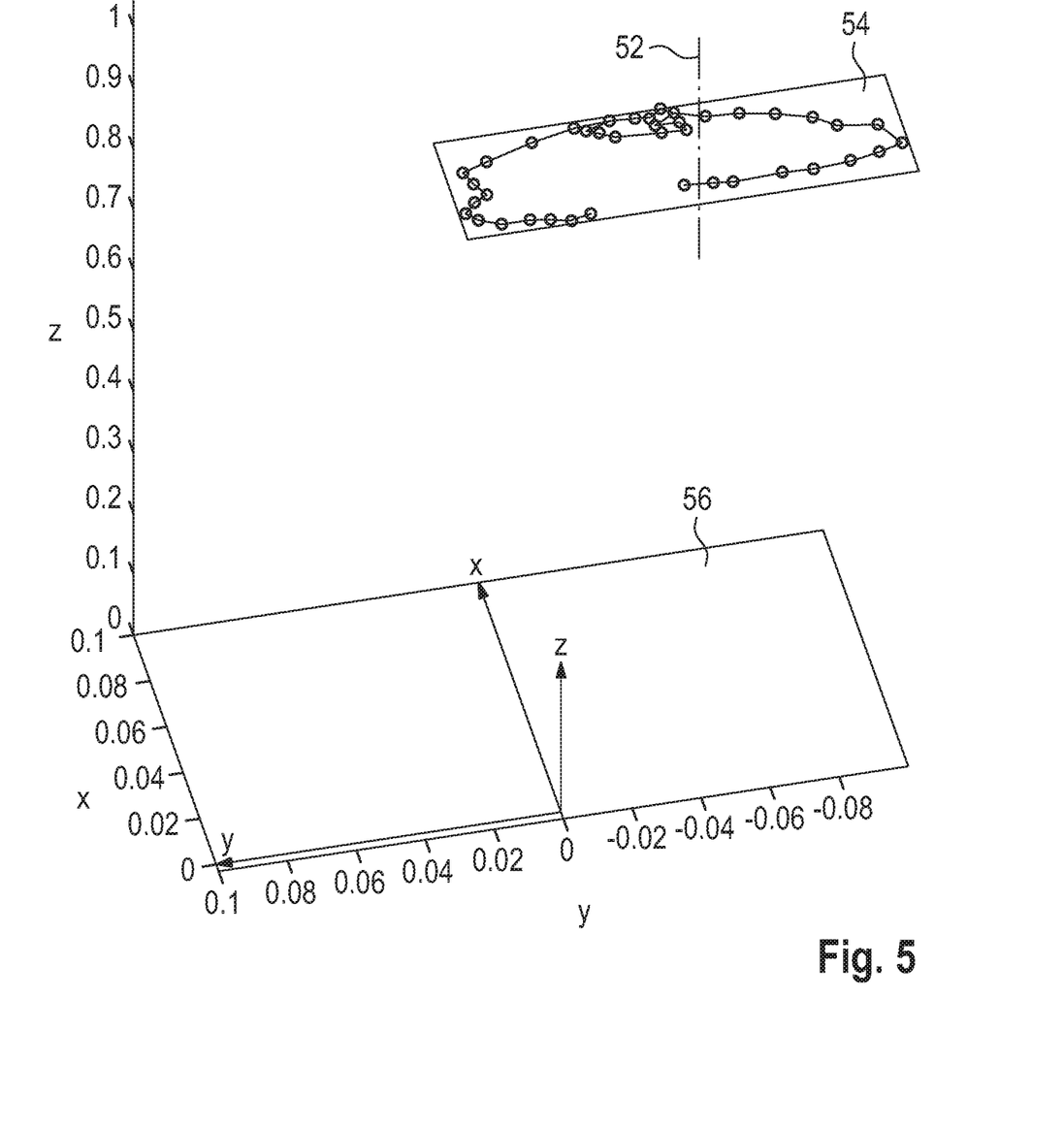
FIG. 5 shows a schematic three-dimensional diagram of the accelerations assigned to the three measurement axes plotted against one another.

In FIG. 5, measured values of the measurement axes x, y and z captured for the accelerations ar, at and g are plotted three-dimensionally with respect to one another. As is evident, the radial acceleration ar and the tangential acceleration at produce an ellipse-like curve, which is displaced in the measurement axis z by the gravitational acceleration g. In method step 50, a curve, specifically an ellipse, is fitted onto the characteristic (the acceleration curve) of the radial and tangential accelerations ar and at plotted with respect to one another and the shape is used as a criterion for the occurrence of the yawing movement. If the shape of the fitted curve is approximated sufficiently closely to an ellipse, specifically with a small residual error, the probability of the occurrence of a yawing movement is high. Other movements are specifically regularly manifested in an irregular—usually zigzag-like—characteristic of the radial and tangential accelerations ar and at plotted with respect to one another. The surface area, specifically the area, of the fitted ellipse in this case reproduces the degree of the yawing movement, i.e. how quickly the head 9 is turned.

Subsequently, the normal vector, specifically the normal vector at the the centroid of the area of the ellipse, is ascertained for the fitted ellipse. This vector corresponds to the axis of rotation or "yawing axis 52" of the yawing movement. As is evident in FIG. 5, the yawing axis 52 is tilted with respect to the measurement axis z, and therefore also a movement plane 54 described by the area of the ellipse and defined by the radial and tangential accelerations ar and at. The tilting of the movement plane 54 with respect to a measurement plane 56 defined by the measurement axes x and y is determined for example by means of the scalar product and the cross product of the yawing axis 52 with the measurement axis z, specifically the axis vector thereof. This tilting information is used to create a "correction quaternion" as a rotation operator for the correction of the tilting, for "correct rotation" of the movement plane 54 parallel to the measurement plane 56, by means of which the acceleration data A are aligned (rotated) parallel to the measurement axes x, y and z and subsequently the fitted ellipse is projected onto the measurement plane 56. This allows the acceleration data A to be mapped onto the two-dimensional measurement plane 56 with little loss.

For the case where the occurrence of the yawing movement has been detected, the tangential acceleration at is integrated twice, and therefore the distance covered during the yawing movement is ascertained. Divided by the radius of the head 9, the current angular position of the head 9 is obtained. Furthermore, in this case the yawing angle G assigned to the current angular position is ascertained. The angular position or the yawing angle G and the yawing axis 52 are used to construct a quaternion referred to as the "movement quaternion Qb". This in turn represents a rotation operator, which represents the movement of the head.

In a subsequent method step 60, by means of the movement information contained in the movement quaternion Qb, an orientation rotation operator assigned to a previous alignment of the head 9, specifically an "orientation quaternion Qn−1", is "updated" in relation to a current orientation quaternion Qn, by the previous orientation quaternion Qn−1 being multiplied by the movement quaternion Qb. A unit quaternion Qe is used as a "first" orientation quaternion Qn for the initialization, i.e. is assumed as a fictitious "starting value". This has the form $$Qe = \begin{pmatrix} 1 \\ 0 \\ 0 \\ 0 \end{pmatrix} \quad (2)$$

Figure 6:
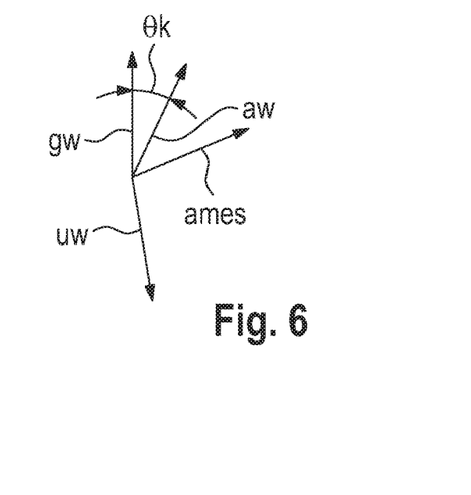
FIG. 6 shows a schematic representation of a method step for ascertaining a correction value for the acceleration data captured by means of the acceleration sensor.

If in method step 40 no movement is detected, in a further method step 70 a correction of the yawing angle G, and also of a pitching angle and a rolling angle of the head 9, is performed for the corresponding "static" data frame D. First, for this purpose, the influence of gravitational acceleration g is removed from the acceleration data A. In order to reduce measurement noise in the acceleration data A, an average value ames is then ascertained for this. Subsequently, the average value ames, specifically the vector assigned to it, is rotated by means of the alignment ascertained for the previous data frames D, specifically therefore by means of the previous orientation quaternion Qn−1 described above. In order to ascertain a residual deviation of the resultant rotated average-value vector aw from the setpoint alignment, prescribed by the global gravitation vector gw, the scalar product and the cross product between the resultant average-value vector aw and the global gravitation vector gw is ascertained. The scalar product in this case gives a correction angle θk and the cross product gives a correction axis uw, about which a rotation with the correction angle θk must take place in order to bring the resultant average-value vector aw in line with the global gravitation vector gw (cf. FIG. 6). This is subsequently used to construct a deviation criterion Qd1.

Furthermore, the yawing angle G is drifted comparatively slowly in the direction of the zero-degree viewing direction 12 during a static data frame D. For this purpose, in method step 70, a yaw-free quaternion Qd2 is ascertained on the basis of the global gravitation vector gw. In other words, this yaw-free quaternion Qd2 only contains the current information of the pitching and rolling angles, while the yawing angle G is set to zero, that is to say to the zero-degree viewing direction 12. The zero-degree viewing direction 12 therefore does not have to (or no longer has to) coincide with the sagittal plane (i.e. be aligned parallel to the median plane 14). Specifically, this yaw-free quaternion Qd2 is ascertained in a way analogous to the deviation quaternion Qd1 described above. Subsequently, spherical interpolation is carried out between the yaw-free quaternion Qd2 and the deviation quaternion Qd1, so that, the longer no movement is detected, the current value of the yawing angle G is brought closer to zero degrees. In other words, the zero-degree viewing direction 12 is displaced from the alignment parallel to the median plane 14 toward the current angular position of the head 9. A new deviation quaternion Qd is formed by this interpolation. In this interpolation—dependent on the desired duration of the drift of the zero-degree viewing direction 12 toward the current angular position of the head 9—angles of between for example 0.5 percent (slow drift) or 2 percent (comparatively rapid drift) are in this case set as the step size.

In method step 60, in a way analogous to the update of the previous orientation quaternion Qn−1 to the current orientation quaternion Qn described above, the new deviation quaternion Qd is subsequently used (instead of the movement quaternion Qb). Subsequently, a return is made to method step 40 for the next data frame.

Figure 7:
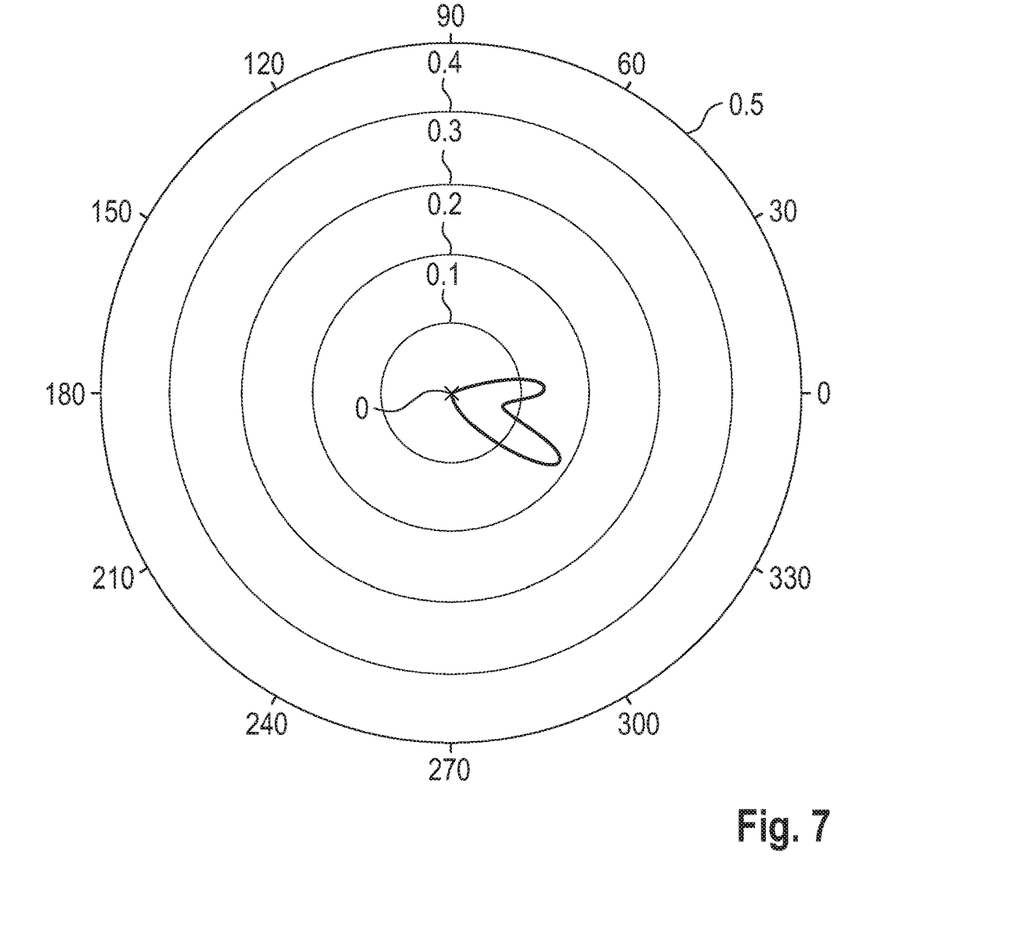
FIG. 7 shows a schematic polar diagram of a probability distribution for adopted viewing directions of the hearing device wearer.

In a method step not shown any more specifically here, a viewing-direction probability distribution is created on the basis of the respective current yawing angle G (see FIG. 7) by a Gaussian normal distribution with a standard deviation of, say, 10 degrees being set for each current yawing angle G. The viewing-direction probability distribution therefore contains a "peak" for each yawing angle G along which the hearing device wearer has directed his view, so that it can be established from this where the hearing device wearer has looked for example in the last minute. In order to allow a "forgetting" or "fading" of comparatively "old" (for example older than 1 to 3 minutes) yawing angles G adopted by the head 9, in an optional exemplary embodiment, before each new entry in the viewing-direction probability distribution, the previous probability values are uniformly lowered. The new normal distribution is entered in a correspondingly weighted manner, so that all of the angular positions add up to one. By means of the viewing-direction probability distribution, it can be estimated whether the hearing device wearer is taking part in a conversation with multiple persons, in which case he would have changed his view multiple times between individual yawing angles G, or whether he is looking "only" in one direction. This information is used by the signal processor 4 for setting a directivity of the microphones 3.

The subject matter of the invention is not restricted to the exemplary embodiments described above. Rather, further embodiments of the invention can be derived from the description above by a person skilled in the art. In particular, the individual features of the invention described on the basis of the different exemplary embodiments, and the refinement variants thereof, can also be combined with one another in another way.

The following is a summary list of reference numerals and the corresponding structure used in the above description of the invention:

1 Hearing device
2 Housing
3 Microphone
4 Signal processor
5 Loudspeaker
6 Acceleration sensor
7 Battery
8 Sound tube
9 Head
  10 Earpiece
  12 Zero-degree viewing direction
  14 Median plane
  20 Method step
  30 Method step
  40 Method step
  50 Method step
  52 Yawing axis 54 Movement plane
56 Measurement plane
60 Method step
70 Method step
A Acceleration data
a$_{mes}$ Average value
a$_r$ Radial acceleration
a$_t$ Tangential acceleration
a$_w$ Resultant average-value vector
D Data frame
G Yawing angle
g Gravitational acceleration
g$_w$ Global gravitation vector
Q$_a$ Normalization quaternion
Q$_b$ Movement quaternion
Q$_d$, Q$_{d1}$ Deviation quaternion
Q$_{d2}$ Yaw-free quaternion
Q$_e$ Unit quaternion
Q$_n$, Q$_{n-1}$ Orientation quaternion
t Time
θ$_k$ Correction angle
u$_w$ Correction axis
x, y, z Measurement axis

The invention claimed is:

1. A method of operating a hearing device having an acceleration sensor which, in an intended worn state, is positioned on the head of a hearing device wearer and is configured to measure in three mutually perpendicular measurement axes, the method comprising:
deducing a movement of the hearing device wearer from acceleration data in an acceleration signal output by the acceleration sensor;
deriving from the acceleration data a movement plane of a movement of the hearing device wearer;
ascertaining from the acceleration data a movement axis and a movement direction of the movement; and
deducing an occurrence of a rotational movement of the head on a basis of the movement plane, the movement axis, and the movement direction; and
when no movement of the hearing device wearer is detected, performing a correction of a pitching angle and/or a rolling angle of the head, the assigned rotational axes of which lie in each case at least roughly in the transversal plane.

2. The method according to claim 1, which comprises using an occurrence of a yawing movement as the occurrence of the rotational movement.

3. The method according to claim 1, which comprises analyzing the acceleration data block by block in successive data frames.

4. The method according to claim 1, which comprises using a range of values and/or a variance of the acceleration sensor as a feature for the occurrence of the movement of the hearing device wearer.

5. The method according to claim 1, which comprises ascertaining from the acceleration data a normalization rotation operator indicative of a rotation of the measurement axes of the acceleration sensor with respect to a transversal plane of the body of the hearing device wearer and/or a horizontal plane in the intended worn state of the hearing device.

6. The method according to claim 5, which comprises ascertaining the rotation of the measurement axes on a basis of a cross product and a scalar product between the gravitation vector ascertained from the acceleration data and a global gravitation vector.

7. The method according to claim 1, which comprises smoothing the acceleration data with a filter.

8. The method according to claim 1, which comprises, for the determination of the rotational movement of the head, including a yawing movement, deriving from the acceleration data an acceleration directed radially with respect to the head of the hearing device wearer and a tangentially directed acceleration for the rotational movement.

9. The method according to claim 8, wherein the movement plane is constructed from the radially directed acceleration and the tangentially directed acceleration, and wherein the movement plane is rotated in such a way that it is aligned parallel to a measurement plane defined by the two measurement axes used for capturing the radially directed acceleration and the tangentially directed acceleration.

10. The method according to claim 9, which comprises, for the rotation of the movement plane, ascertaining a tilting of the movement plane with respect to the measurement plane by fitting an ellipse into a characteristic of the radially directed acceleration and the tangentially directed acceleration plotted against one another, assuming a normal vector of the area of the ellipse as a movement axis and ascertaining a tilting angle for the normal vector with respect to the measurement plane.

11. The method according to claim 10, which comprises constructing a movement rotation operator for a current movement of the head of the hearing device wearer by way of the movement plane by ascertaining a rotation angle of the rotational movement of the head based on the tangentially directed acceleration.

12. The method according to claim 10, which comprises only ascertaining the rotation angle of the rotational movement of the head on a basis of the tangentially directed acceleration if the occurrence of the rotational movement is detected.

13. The method according to claim 9, which comprises ascertaining an area of an ellipse as a feature for the occurrence of a rotational movement of the head and deducing an occurrence of the rotational movement on a basis of a manifestation of the feature.

14. The method according to claim 9, which comprises deriving an assigned intensity and/or the intensity of a tangential velocity from the tangentially directed acceleration as a feature for an occurrence of a rotational movement of the head of the hearing device wearer.

15. The method according to claim 1, which comprises rotating the acceleration data of a current data frame by way of alignment information of a preceding data frame, and, for the acceleration data rotated in such a way, ascertaining in each case a residual deviation of an alignment in comparison with the previous data frame by way of a cross product and a scalar product.

16. The method according to claim 15, which comprises constructing a deviation rotation operator with the residual deviation.

17. The method according to claim 1, which comprises, when no movement of the hearing device wearer is detected, performing a correction of a yawing angle assigned to a yawing movement by adjusting a main viewing direction of the hearing device wearer away from a median plane of the body of the hearing device wearer toward a current viewing direction.

18. The method according to claim 17, which further comprises ascertaining a yaw-free rotation operator, with which the yawing angle is set to zero degrees, on a basis of a global gravitation vector, and carrying out a spherical interpolation between the yaw-free rotation operator and a deviation rotation operator to form a new deviation rotation operator.

19. A method of operating a hearing device having an acceleration sensor which, in an intended worn state, is positioned on the head of a hearing device wearer and is configured to measure in three mutually perpendicular measurement axes, the method comprising:
    deducing a movement of the hearing device wearer from acceleration data in an acceleration signal output by the acceleration sensor;
    deriving from the acceleration data a movement plane of a movement of the hearing device wearer;
    ascertaining from the acceleration data a movement axis and a movement direction of the movement; and
    deducing an occurrence of a rotational movement of the head on a basis of the movement plane, the movement axis, and the movement direction;
    for the determination of the rotational movement of the head, including a yawing movement, deriving from the acceleration data an acceleration directed radially with respect to the head of the hearing device wearer and a tangentially directed acceleration for the rotational movement;
    constructing the movement plane from the radially directed acceleration and the tangentially directed acceleration, and rotating the movement plane in such a way that it is aligned parallel to a measurement plane defined by the two measurement axes used for capturing the radially directed acceleration and the tangentially directed acceleration;
    for the rotation of the movement plane, ascertaining a tilting of the movement plane with respect to the measurement plane by fitting an ellipse into a characteristic of the radially directed acceleration and the tangentially directed acceleration plotted against one another, assuming a normal vector of the area of the ellipse as a movement axis and ascertaining a tilting angle for the normal vector with respect to the measurement plane;
    constructing a movement rotation operator for a current movement of the head of the hearing device wearer by way of the movement plane by ascertaining a rotation angle of the rotational movement of the head based on the tangentially directed acceleration;
    ascertaining a new orientation rotation operator for a current alignment of the head by offsetting a previous orientation rotation operator against the movement rotation operator or against a deviation rotation operator.

20. The method according to claim 19, which comprises creating a viewing-direction probability distribution based on the orientation rotation operator.

21. The method according to claim 20, wherein a Gaussian normal distribution with a prescribed standard deviation is assumed on a basis of the main viewing direction, and wherein a new normal distribution with a prescribed standard deviation is set for a current yawing position.

22. The method according to claim 10, which comprises variably prescribing a standard deviation based on a residual error of a determination of the movement plane.

23. The method according to claim 1, which comprise using information concerning the rotational movement of the head of the hearing device wearer.

24. A hearing device, comprising:
    an acceleration sensor, which in an intended worn state is positioned on the head of a hearing device wearer and is configured for measurement in three mutually perpendicular measurement axes; and
    a processor connected to said acceleration sensor and configured for performing the method according to claim 1.

25. The method according to claim 19, which comprises ascertaining a corresponding quaternion in each case as the rotation operator.

26. The method according to claim 1, which comprise using information concerning the rotational movement of the head of the hearing device wearer, and a viewing-direction probability distribution, for adapting a signal processing algorithm for a group discussion situation.

* * * * *